US005753158A

United States Patent [19]

Orsing

[11] Patent Number: 5,753,158

[45] Date of Patent: May 19, 1998

[54] METHOD FOR MANUFACTURING ASPIRATORS FOR MEDICAL AND DENTAL USE

[76] Inventor: Ernst Orsing, Missionsgatan 12, S-252 70 Råå, Sweden

[21] Appl. No.: 877,976

[22] Filed: Jun. 18, 1997

Related U.S. Application Data

[63] Continuation of Ser. No. 406,923, filed as PCT/SE93/00798, Oct. 4, 1993, published as WO94/07662, Apr. 14, 1994, abandoned.

[30] Foreign Application Priority Data

Oct. 2, 1992 [SE] Sweden ........ 9202889

[51] Int. Cl.[6] ........ B29C 47/00; B28B 11/16; B26D 1/03; B26D 1/1117

[52] U.S. Cl. ........ 264/150; 264/154; 264/156; 264/159; 425/307; 425/308; 83/23; 83/49; 83/50; 83/52; 83/54; 83/42; 83/46

[58] Field of Search ........ 425/307, 308; 364/150, 154, 159, DIG. 66, 148; 83/23, 49, 50, 52, 54, 42, 46

[56] References Cited

U.S. PATENT DOCUMENTS

| | | | |
|---|---|---|---|
| 2,670,795 | 3/1954 | Griep | 83/54 |
| 2,972,779 | 2/1961 | Cowley | 83/54 |
| 3,086,246 | 4/1963 | Stone | 264/DIG. 66 |
| 3,821,912 | 7/1974 | Howe . | |
| 3,863,538 | 2/1975 | Behnke | 83/676 |
| 3,996,832 | 12/1976 | Schubert et al. | 83/54 |
| 4,123,189 | 10/1978 | Ferlise et al. | 83/54 |
| 4,218,164 | 8/1980 | Lupke et al. | 83/54 |
| 4,330,497 | 5/1982 | Agdanowski | 264/150 |
| 4,608,046 | 8/1986 | Towfigh | 604/329 |
| 4,989,482 | 2/1991 | Mason | 83/54 |
| 5,102,599 | 4/1992 | Shults | 425/308 |

FOREIGN PATENT DOCUMENTS

| | | |
|---|---|---|
| 0201402 | 12/1986 | European Pat. Off. . |
| 0347590 | 12/1989 | European Pat. Off. . |

*Primary Examiner*—Jan H. Silbaugh
*Assistant Examiner*—Robin S. Gray
*Attorney, Agent, or Firm*—Merchant, Gould, Smith, Edell, Welter, & Schmidt, P.A.

[57] ABSTRACT

Method for manufacturing aspirator tubes (10) for medical and dental use which are provided with two opposite air apertures (13) adjacent at least one end thereof. The air apertures are made in a tube length which is moving axially and is cut to individual aspirators tubes. The apertures are made and the tube length is cut by means of continuously rotating cutters (17, 18, 22, 23) which are cuttingly engaged with the tube length at predetermined revolutions only while said cutters are brought to idle therebetween, withdrawn from the tube length.

1 Claim, 3 Drawing Sheets

METHOD FOR MANUFACTURING ASPIRATORS FOR MEDICAL AND DENTAL USE

This is a Continuation of application Ser. No. 08/406,923, filed Mar. 21, 1995, abandoned, which is a National Stage Application of PCT/SE93/00798 filed Oct. 4, 1993, published as WO94/07662, Apr. 14, 1994.

The invention relates to a method for manufacturing aspirator tubes for medical and dental use, which are provided with two opposite air apertures adjacent at least one end thereof.

A rational manufacture of such aspirator tubes of plastics requires that the air apertures are made when the tube is being extruded and also that the extruded tube length is cut to individual aspirator tubes while the tube length is moving axially. At present the apertures are made by punching which means that flying punches have to be used, i.e. punches which during the punching operation are moving along with the tube length in the axial movement thereof. Also a flying cutting device then must be used. This results in complicated machine constructions and in limitation of the rate of manufacture because the punch as well as the cutting device must be returned in the direction opposite to the moving direction of the tube length between consecutive working operations.

Another drawback is that when one of the air apertures is punched, which is done from the outside of the tube length towards the inside thereof, burrs are obtained at the inside of the tube wall and that the material which is cut off when the aperature is made will land inside the tube length. A die can be used for the other air aperture so that no burr will be obtained at the outside of the tube, and in this case there is of course no risk that the cut off material will land inside the tube length.

The purpose of the invention is to eliminate said drawbacks, and for this purpose the method according to the invention has obtained characterizing features. Then, the cutters are engaged and disengaged with the tube length by a simple reciprocating movement transversely of the tube length (not necessarily perpendicularly to the tube length) and this is made possible by rotating the cutters at a rotational speed which is so high that the working operation can be accomplished on the moving tube length without the necessity of moving the cutters along with the tube length as should have been necessary if the cutters were engaged with the tube length one or two times for each revolution, because the rotational speed then must be sufficiently low in order that the required axial distance between the sites worked on of the tube length will be maintained; this distance is of course determined by the length of the individual aspirator tubes.

Figure 1:
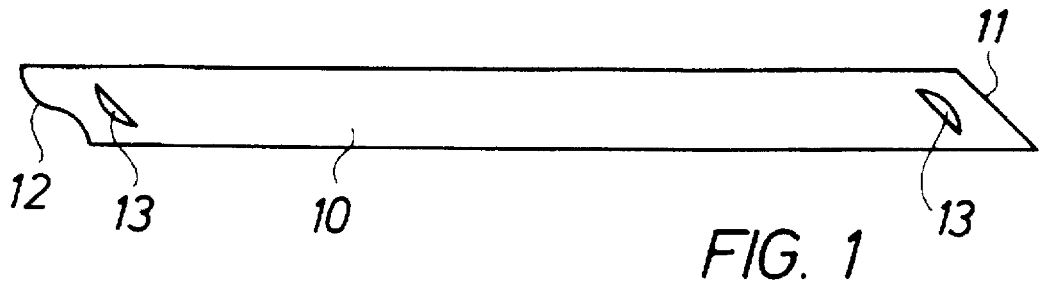
Figure 2:
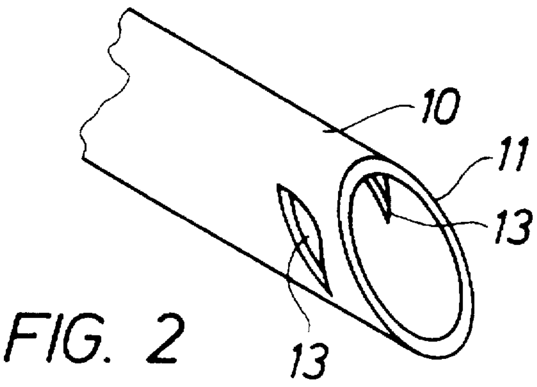
Figure 3:
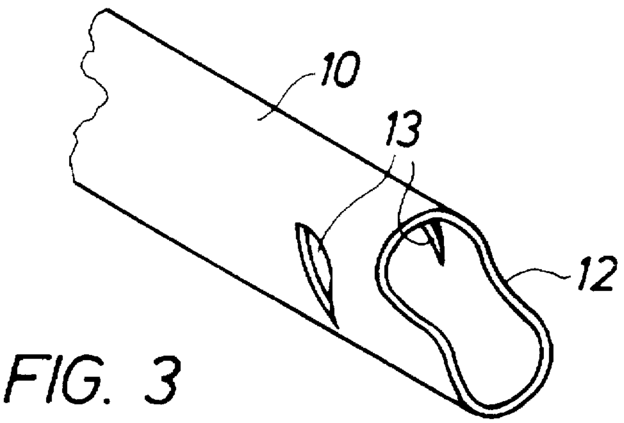
Figure 4:
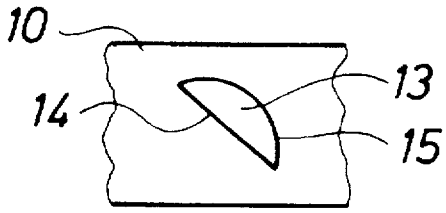
Figure 5:
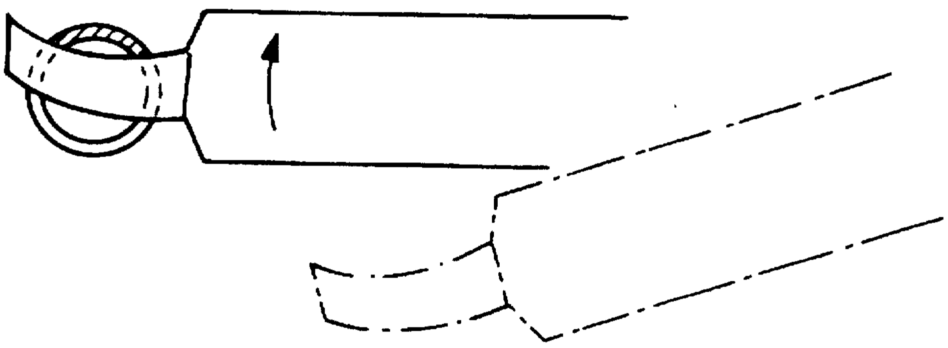
Figure 6:
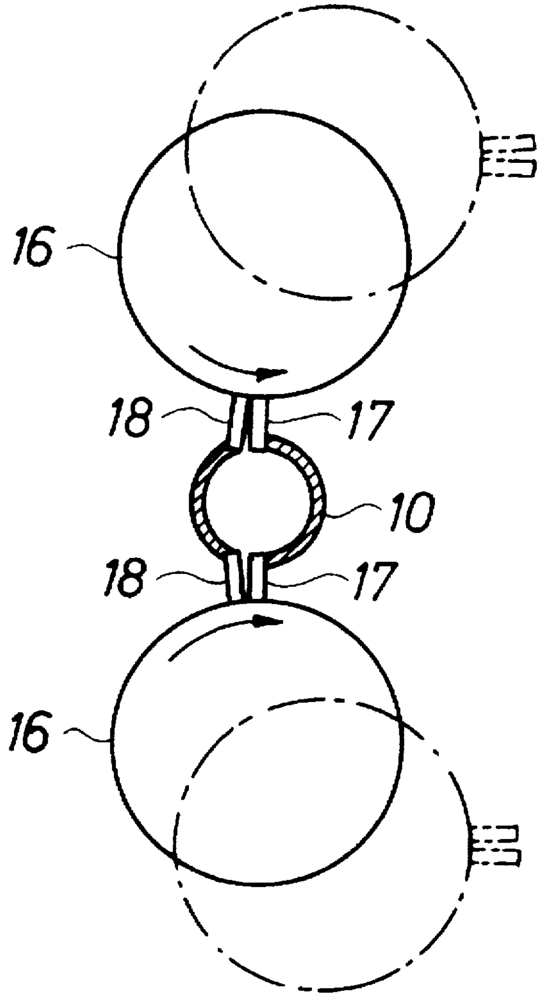
Figure 7:
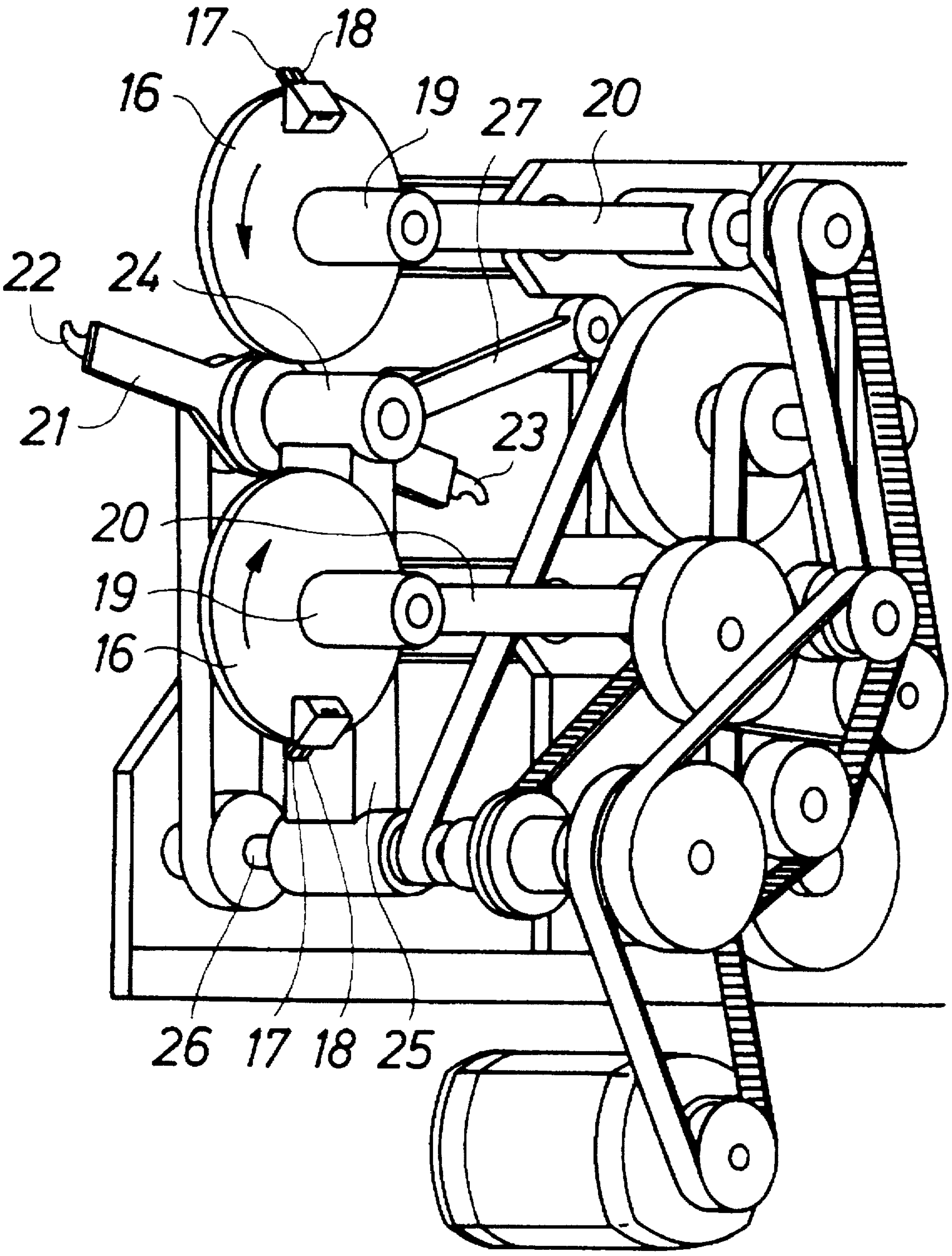

In order to explain the invention in more detail reference is made to the accompanying drawings in which FIG. 1 is a side view of an aspirator tube to be manufactured by the method of the invention, FIGS. 2 and 3 are fragmentary perspective views of one end portion and the other, respectively, of the aspirator tube, FIG. 4 is a fragmentary plan view of the tube illustrating the shape of the air apertures FIG. 5 is a diagrammatic view of a cutter in the shape of a knife for cutting a tube length shown in cross sectional view, FIG. 6 is a diagrammatic view of a device for making the air apertures in the tube length also shown in cross sectional view, and FIG. 7 is a perspective view of a constructive embodiment of a device for supporting, mounting and operating knife and cutters.

The aspirator tube 10 in FIG. 1 has circular cross sectional shape and is made of relatively hard plastics e.g. polyethylene. At one end thereof the tube is obliquely cut off by a straight cut at 11, the other end being obliquely cut off by an S-shaped cut at 12. Adjacent each end the aspirator tube has two diametrically opposite air apertures 13 defined by a straight edge 14 and a circularly curved edge 15 as best seen in FIG. 4.

For the manufacture of the aspirator tube a continuous tube length is extruded leaving the extruder at a predetermined axial speed which for productional and economical reasons should be as high as admitted by the extruder and the prevailing quality requirements. When the tube length in a conventional manner has passed through a calibrator and a cooler and a following puller the air apertures are initially made and then the tube length is cut for producing the individual aspirator tubes.

Rotating cutting devices according to FIG. 6 are used for making the air apertures at diametrically opposite sides of the aspirator tube. On rotating discs 16 there are provided two cutters one cutter 17 thereof which is ahead of the other cutter 18 as seen in the rotational direction (indicated by an arrow) is constructed to make a straight cut in the tube wall corresponding to edge 14, while said other cutter 18 is constructed to make the curved cut corresponding to edge 15. Cutter 18 is a recessing cutter so that it lifts out at the same time the cut-out circle segment from the tube wall. The cutters must be cuttingly engaged with the moving tube length at predetermined intervals in order that the finished aspirator tubes shall have the air apertures at the correct locations, and it will be understood that the rotational speed of the discs must be related to the axial moving speed of the tube length. On the other side the discs must not rotate too slowly because the cutting operation then takes such a long time in relation to the axial moving speed of the tube length that the cutters during the cutting operation must be moved along with the tube length. Therefore, in the method according to the invention therefore such a high speed of the discs is chosen as is required in order to avoid simultaneous axial movement of the cutters. The cutters are instead engaged periodically with the tube length while the cutters between the engagements are idling laterally of the tube length. This can easily be effected by mounting the discs according to FIG. 7 in bearings 19 which are mounted to arms 20 which can be pivoted up and down. Thus, the discs are moved periodically towards each other to the position shown by solid lines in FIG. 5, which is the operative position, and away from each other to the position shown by dot-and-dash lines, which is the idling position. The cutters should be in the idling position as long as is necessary in order that the tube length shall have advanced so far that the next position where air apertures are to be made will register with the discs. The discs rotate continuously at one and the same speed. Each disc can have one pair or several pairs of cutters.

When the air apertures have been made the tube length will be cut at pre-determined positions in order to produce the individual aspirator tubes. Such cutting is made by means of a knife 21 similar to a propeller, which has a straight cutter 22 and an S-shaped cutter 23, (FIG. 7). The knife is rotated at a speed sufficiently high to allow the tube length to be cut off without the necessity of simultaneously moving along with the tube length in the axial movement thereof, but it is engaged with the tube length periodically. It is outside the tube length in the intervals therebetween and thus is idling according to the same principles as applied to cutters 17 and 18. According to FIG. 7 knife 21 is rotatably mounted in a bearing 24 on an arm 25 which is pivoted on a shaft 26 and is connected by a connecting rod 27 to a crank or excenter effecting pivotal movement of the arm for displacement of the knife between an operative position and an inoperative position (idling position).

In FIG. 7 there is shown a drive motor and a gear belt transmission for effecting the several movements of cutters and knife but it would not be necessary to describe this arrangement in detail because it is based on conventional transmission technique.

The cutters and knifes should of course be positioned in oblique angle to the axis of the tube length because the aspirator tubes are cut obliquely and the air apertures extend along the oblique end edges.

I claim:

1. A method of manufacturing individual aspirator tubes comprising the steps of:

extruding a straight tube length of plastic material;

said extruding step forming an axially moving straight tube length;

providing a rotary cutter having a rotation axis spaced transversely of said axially moving straight tube length, said rotary cutter including a first cutting blade projecting radially from said rotary cutter for making a straight cut, and a second cutting blade projecting radially from said rotary cutter for making an S-shaped cut, said first cutting blade and said second cutting blade being mutually spaced circumferentially of said rotary cutter around said rotation axis;

continuously rotating said rotary cutter to provide a rotating cutter about said rotation axis; and making successive transverse cuts to said axially moving straight tube length by engaging said first cutting blade followed by said second cutting blade of the rotating cutter, one at a time with an interval of time therebetween, with said axially moving straight tube length during said extruding step;

said engaging of said first cutting blade followed by said second cutting blade with said axially moving straight tube length occurring once during each revolution of said rotating cutter; and said first cutting blade and said second cutting blade cutting through the axially moving straight tube length in a transverse direction thereof at separate locations on the axially moving straight tube length, said successive transverse cuts being spaced axially thereof due to axial movement of the axially moving straight tube length to divide the axially moving straight tube length into individual aspirator tubes, one of said successive transverse cuts being an oblique straight cut through the axially moving straight tube length to define a first end for each of the individual aspirator tubes, and a second cut being an oblique S-shaped cut through the axially moving straight tube length, spaced axially from said oblique straight cut to define a second end for each of the individual aspirator tubes.

* * * * *